United States Patent
Wei et al.

(10) Patent No.: US 8,204,874 B2
(45) Date of Patent: *Jun. 19, 2012

(54) ABBREVIATION HANDLING IN WEB SEARCH

(75) Inventors: Xing Wei, Santa Clara, CA (US);
Fuchun Peng, Sunnyvale, CA (US);
Benoit Dumoulin, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/884,708

(22) Filed: Sep. 17, 2010

(65) Prior Publication Data

US 2011/0010353 A1  Jan. 13, 2011

Related U.S. Application Data

(63) Continuation of application No. 12/103,126, filed on Apr. 15, 2008, now Pat. No. 7,809,715.

(51) Int. Cl.
*G06F 17/00* (2006.01)
*G06F 7/00* (2006.01)

(52) U.S. Cl. ................................. 707/713

(58) Field of Classification Search ............... None
See application file for complete search history.

(56) References Cited

U.S. PATENT DOCUMENTS

| | | |
|---|---|---|
| 7,136,876 B1 | 11/2006 | Adar et al. |
| 2007/0067157 A1 | 3/2007 | Kaku et al. |
| 2008/0086297 A1 | 4/2008 | Li et al. |
| 2009/0083255 A1 | 3/2009 | Li |
| 2009/0259629 A1 | 10/2009 | Wei et al. |

OTHER PUBLICATIONS

Aronson, Alan R., "The Effect of Textual Variation on Concept Based Information Retrieval," Proc AMIA Annu Fall Symp. 1996;:373-7.
Jain, Alpa, et al., "Acronym-Expansion Recognition and Ranking on the Web," IRI 2007. IEEE International Conference, Aug. 13-15, 2007, pp. 209-224.
Pakhomov, Serguei, et al., "Abbreviation and Acronym Disambiguation in Clinical Discourse," *AMIA Annu Symp Proc.* 2005; 2005: 589-593.

*Primary Examiner* — Uyen T. Le
(74) *Attorney, Agent, or Firm* — Nathan O. Greene; Brinks Hofer Gilson & Lione

(57) ABSTRACT

A method for handling abbreviations in web queries includes building a dictionary of possible word expansions for potential abbreviations related to query terms received and anticipated to be received by a search engine; accepting a query including an abbreviation from a searching user, where a probability of finding a most probably-correct expansion in the dictionary is a first probability, and a probability that the expansion is the abbreviation itself is a second probability; determining a ratio between the first and second probabilities; expanding the abbreviation in accordance with the most probably-correct expansion when the ratio is above a first threshold value; and highlighting the abbreviation with a suggested expansion of the most probably-correct expansion for the user so that the user may accept the suggested expansion when the ratio is between a second, lower threshold value and the first threshold value.

22 Claims, 3 Drawing Sheets

ABBREVIATION HANDLING IN WEB SEARCH

RELATED APPLICATIONS

This application claims the benefit of the filing date of U.S. patent application Ser. No. 12/103,126, filed Apr. 15, 2008, now U.S. Pat. No. 7,809,715, issued Oct. 5, 2010, the entire contents of which are incorporated by reference herein.

BACKGROUND

1. Technical Field

The disclosed embodiments relate to systems and methods for normalizing query words in web search, and more specifically, for the handling of abbreviations detected in the queries to possibly expand them when likely to improve search results.

2. Related Art

Internet advertising is a multi-billion dollar industry and is growing at double digits rates in recent years. It is also the major revenue source for internet companies, such as Yahoo! of Sunnyvale, Calif. or Google of Mountain View, Calif., which provide advertising networks that connect advertisers, publishers, and Internet users. A major portion of revenue has historically come from sponsored search advertisements and other advertising related to search through search engines, for instance.

A search engine is a computer program running a server that helps a user to locate information. Using a search engine, a user can enter one or more search query terms and obtain a list of resources that contain or are associated with subject matter that matches those search query terms. While search engines may be applied in a variety of contexts, search engines are especially useful for locating resources that are accessible through the Internet. Resources that may be located through a search engine include, for example, files whose content is composed in a page description language such as Hypertext Markup Language (HTML). Such files are typically called pages. One can use a search engine to generate a list of Universal Resource Locators (URLs) and/or HTML links to files, or pages, that are likely to be of interest.

Some search engines order a list of web pages before presenting the list to a user. To order a list of web pages, a search engine may assign a rank to each file in the list. When the list is sorted by rank, a web page with a relatively higher rank may be placed closer to the head of the list than a file with a relatively lower rank. The user, when presented with the sorted list, sees the most highly ranked files first. To aid the user in his search, a search engine may rank the web pages according to relevance. Relevance is a measure of how closely the subject matter of the web page matches query terms.

To find the most relevant files, search engines typically try to select, from among a plurality of web pages, web pages that include many or all of the words that a user entered into a search request. Unfortunately, the web pages in which a user may be most interested are too often web pages that do not literally include the words that the user entered into the search request. If the user has misspelled a word in the search request, then the search engine may fail to select web pages in which the correctly spelled word occurs. Typically, eight to ten percent of queries to web search engines have at least one query term that is misspelled. While technically not a misspelling, abbreviated words in queries may often not be recognized or not used in the abbreviated form in many of the web pages.

The core, or organic, search results are usually based on some relevancy model while other parts of the search results web page are set apart for sponsored search advertisements paid for by advertisers to be returned with the organic search results for specific keywords. Without returning relevant results, however, user satisfaction with a search engine is likely to decline and, therefore, so will advertisers interested in sponsored search listings that target those users. Accordingly, a search engine needs to return results as relevant as possible to the entered search terms, regardless of whether an abbreviation is used that may be poorly recognized throughout the web pages available to the search engine.

Mining text associations, especially, word associations, is important to Information Retrieval (IR) to achieve semantic match instead of literal word match. Most automatic text association-finding methods are based on word co-occurrence information. Though these techniques are effective in document modeling, they often fail in query modeling because of (i) lack of information in queries, (ii) noise in data resources, especially for web data, and (iii) difficulties to achieve precise text associations, e.g., it may be easy to associate "apple" with "fruit" but is hard to associate only "the most popular Japanese apple" with "Fuji" though they have the same search intent.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

Figure 1:
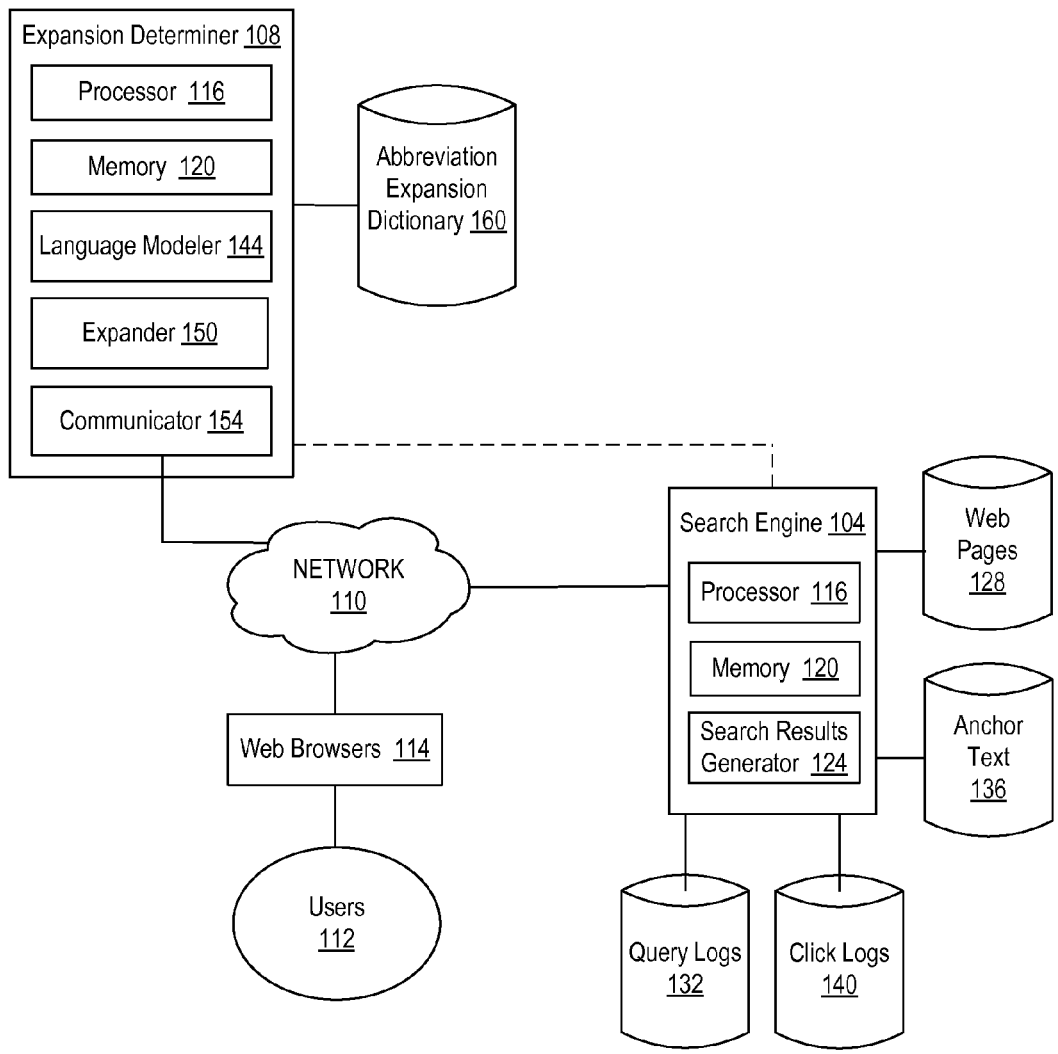
FIG. 1 is a diagram of an exemplary system for normalizing query words in web search, and specifically, for the handling of abbreviations detected in the queries to possibly expand them when likely to improve search results.

By way of introduction, the disclosed embodiments relate to systems and methods for normalizing query words in web search, and more specifically, for the handling of abbreviations detected in the queries to possibly expand them when likely to improve search results. Accordingly, the disadvantages are avoided of returning irrelevant or poorly relevant results in response to a query including a term that is or that could be an abbreviation.

One important application of text association in web search is abbreviation disambiguation. For example, the word "aim" in the query "aim download" probably means "aol instant messenger"; while in query "aim stock," it probably means "alternative investment market"; and in the query "Aim at Spain's gains," it probably stands for the word "aim" itself. Correctly expanding "aim" to its full representation can dramatically improve search quality. However, a bad expansion will also significantly hurt search quality.

To alleviate the problems with text associating methods for query reformulation, the present embodiments do not use documents as the resource from which to mine associations, but contextual, web-related data culled from user interaction with a search engine and with web pages returned in response to user queries. In addition to query logs, explored are other resources that can give extra evidence for abbreviation disambiguation: anchor text and click logs. These three resources give different evidence for text association. The motivation for using query logs is that users often reformulate a query to get better results if the original query did not satisfy the user.

For example, if "aim download" did not return accurate results, a user may reformulate the query into "aol instant messenger download." From here we can learn the association between "aim" and "aol instant messenger." Anchor text is another useful resource: users may use different text to link to the same page using hyperlinked text. Based on this co-link information, one can infer probability of text association. A third useful resource includes click logs where users click the same page from different queries. These three resources are easily accessible by search engines and corresponding logs, and are accurate in the sense that they all have humans involved in the process, which through trial and error, continue to adjust their behavior to achieve better search results. Herein is presented a statistical model to leverage these three resources for abbreviation disambiguation and validate the effectiveness on real search data.

Normalization is the process of reducing complex data structure into its simplest, most stable structure. In general, the process of normalization entails the removal of redundant attributes, keys, and relationships from a conceptual data model. It is a mathematical process that adjusts for differences among data from varying sources in order to create a common basis for comparison. Normalization is also referred to as the transformation of data to a normal form, for instance, to unify spelling. A normalized data structure minimizes data redundancy and data element coupling, and maximizes data element cohesion. Applied to abbreviations, normalization seeks to choose the best expansion for an abbreviated term where it improves data element cohesion throughout web pages available for search results, and leaves the abbreviation unexpanded where it is likely that the abbreviation itself is the word that should be searched for within the query.

Typically, prior methods of handling misspellings include suggesting an alternative to the searching user who can choose the alternative spelling or not. This may also be referred to as "highlighting" the misspelled term for the user, which may then be selected by the user to cause the search engine to re-run the search based on the selected highlighted term. Suggesting an alternative may still be employed in the current embodiments with regards to abbreviations of a middle range of certainty, between a high probability that the abbreviation should be expanded and a low probability, e.g., that the word should remain the abbreviation itself and not be expanded. Between these extremes, the user may be the best to make the decision whether or not to expand.

Note that abbreviations come in several forms, all of which are contemplated with regards to abbreviation handling as disclosed herein. For instance, acronyms are abbreviations pronounced as a series of constituent letters such as "SARS" for severe acute respiratory syndrome. An initialism is an abbreviation pronounced wholly or partly using the names of its constituent letters, such as "CD" for compact disc or "IRS" for the Internal Revenue Service. A pseudo-blend is an abbreviation whose extra or omitted letters means that it cannot stand as a true acronym, initialism, or portmanteau (or a word formed by combining two or more words). An example of a pseudo-blend is "UNIFEM" for United Nations Development Fund for Women.

FIG. 1 is a diagram of an exemplary system 100 for normalizing query words in web search, and specifically, for the handling of abbreviations detected in the queries to possibly expand them when likely to improve search results. The system 100 includes a search engine 104, an expansion determiner 108, a network 110, and multiple users 112 that search using the search engine 104 through a variety of web browsers 114 that communicate over the network 10. The search engine 104 may be located remotely over the network 110 with reference to the expansion determiner 108, and the two may be operably coupled with each other or even be part of the same server or computer, as indicated by the dashed line. Herein, the phrase "coupled with" is defined to mean directly connected to or indirectly connected through one or more intermediate components. The network 110 may include the Internet or World Wide Web ("web"), a wide area network (WAN), a local area network ("LAN"), and/or an extranet, connected to through use of either a wired or wireless connection.

The search engine 104 may include a processor 116, a memory 120, a search results generator 124, a web pages database 128, a query logs database 132, an anchor text database 136, and a click logs database 140. Furthermore, the expansion determiner 108 may include a processor 116, a memory 120, a language modeler 144, an expander 150, a communicator 154, and an abbreviation expansion dictionary database 160 (variably referred to herein as an abbreviation database 160 or abbreviation dictionary 160). The communicator 154 of the expansion determiner 108 may include a communication interface such that the expansion determiner 108 can couple itself with the search engine 104 even if over the network 110. The processor 116 and the memory 120 may be coupled with the language modeler 144, the expander 150, and the communicator 154 and with each other.

As the users 112 submit queries to the search engine 104, the search results generator 124 searches for the closest approximation of that term among the web pages of the web pages database 128, and returns the same to the web browsers 114 of the user 112. Oftentimes, the users 112 will reformulate their queries in search of more accurate or relevant search results. In some cases, the users 112 may do so to spell them correctly or to expand abbreviations to corresponding expanded words of the abbreviations in attempts to improve the results of their search queries. The search engine 104 is capable of tracking these multiples of search queries and storing them in the query logs database 132. The search engine 104 may also track, and store in the click logs database 140, the query words used to reach the same web page where the queries varied. The search engine 104 may also track, and store in the anchor text database 136, the anchor text associated with different hyperlinks that lead to the same web page. In this way, the different text terms that may be associated with an abbreviation in some way are tracked by the context of use of those text terms with reference to the abbreviation.

The expansion determiner 108 may then pull the abbreviations and their corresponding contextual potential expansions stored in the query logs, click logs, and anchor text databases 132, 136, 140 to populate the abbreviation expansion dictionary database 160. The abbreviation database 160 may, accordingly, store a plurality of the abbreviations in relation to possible expansion words along with their frequency of co-occurrence through tracking the human use of altering query terms, creation of links to a same page having different text associated therewith, and clicking to a same page through dissimilar queries.

The expansion determiner 108 may then act as an intermediary to the search engine 104, receiving search queries from users' web browsers 114 through the communicator 154 and conducting a probabilistic analysis on any abbreviated terms to decide whether or not to expand those terms before sending the rewritten queries to the search engine 104. The language modeler 144 conducts the probabilistic analysis on the abbreviated words to decide how to handle each potential abbreviation, and the expander 154 rewrites the queries to include the expanded term(s) where the expansion is likely to improve the relevancy of the search results returned in response to the queries. As one skilled in the art can appreciate, the language modeler 144 may be combined with the expander 150 as the same set of hardware and/or software running on the hardware. Any rewritten queries to include expanded terms and any queries that are decided not to be expanded are sent by the communicator 154 to the search engine to be executed in a search. In the cases of probabilities between two thresholds, given an intermediate level of certainty remains as to the correctness of an expanded abbreviation, the processor 116 and communicator 154 may interface with the web browsers 114 to highlight a potential expansion of the abbreviation for the users 112. Each user 112 may then make a choice whether or not to expand those specific terms.

Figure 2:
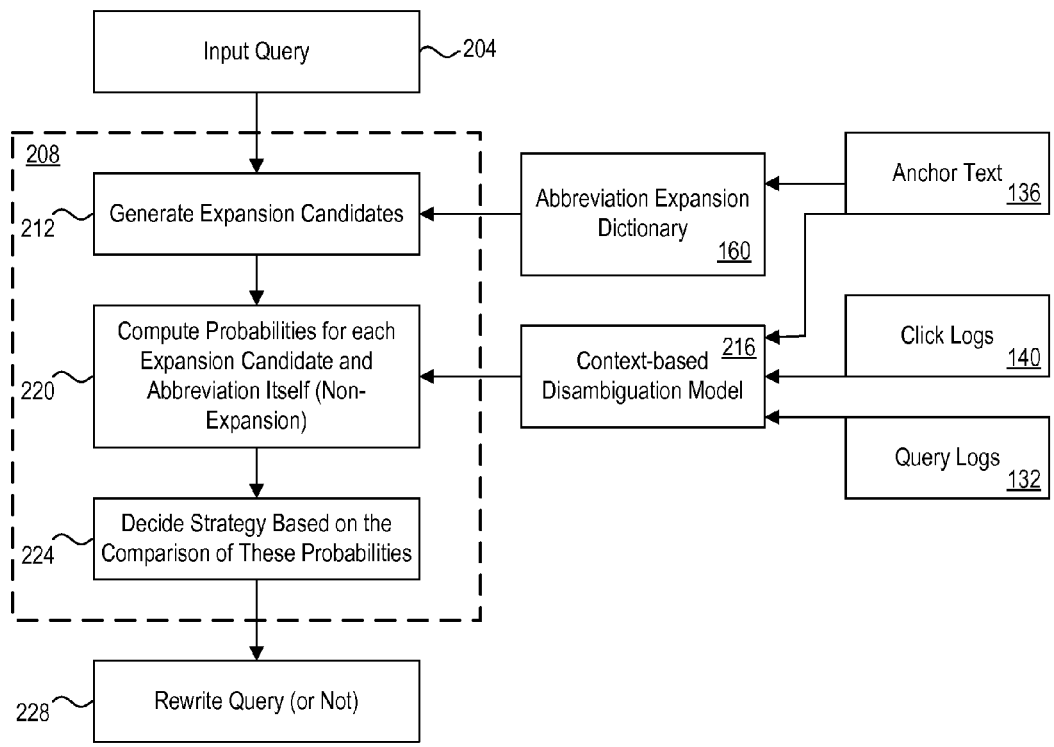
FIG. 2 is a flow diagram that provides an overall flow of the methods explained herein that receive a query and analyze it to decide whether or not a probability is high enough to justify expanding an abbreviated word in a query, or to leave it unexpanded.

FIG. 2 is a flow diagram 200 that provides an overall flow of the methods explained herein that receive a query and analyze it to decide whether or not a probability is high enough to justify expanding an abbreviated word in a query, or to leave it unexpanded. As discussed above, the expansion determiner 108 may function as an intermediary between the searching users 112 and the search engine 104, to receive user search queries, analyze them, and submit reformulated or rewritten queries to the search engine 104 in some cases. Accordingly, at block 204, the communicator 154 receives an input query containing at least one term detected as a potential abbreviation. At bock 208, the processor 116 and the language modeler 144 combine to conduct the probabilistic analysis discussed above and that will be discussed in some detail below.

Within block 208, at block 212, the expansion determiner 212 generates expansion candidates for the words of the query by way of comparison with the abbreviation expansion dictionary database 160. At block 216, the language modeler 150 applies a context-based disambiguation model 216 to potential abbreviated terms using as a resource for the context the anchor text, the click logs, and the query logs from their respective databases 136, 140, and 132. Based on the outputs of the disambiguation model, at block 220, the language modeler 144 computes the probabilities for each expansion candidate as well as the probabilities for correctly leaving the abbreviation alone, e.g., not expanding the abbreviation.

At block 224, the language modeler 144 makes a final determination based on the probabilities which of three possible strategies to follow: (1) expand the abbreviation; (2) highlight for the user 112 the top-ranked candidate for expansion as a suggested expansion; and (3) not expanding the term. At block 228, the expander 154 rewrites the abbreviation for cases of (1) above and passes the rewritten query to the communicator 154 for submission to the search engine 104. The language modeler 144 may also directly pass queries to the communicator 154 in cases of strategy (3), and communicate the need to highlight specific potential expansion candidates to the communicator 154 in cases of strategy (2).

The following is but one embodiment of comparing probabilities to determine which of the above three strategies to follow faced with a potential abbreviation in a search query. A first probability is determined as the probability that a most probable expansion from the abbreviation dictionary 160 is the correct expansion. A second probability is determined as the probability that the expansion is the abbreviation itself A ratio between the first and second probabilities may then dictate which of the above three strategies is followed. Accordingly, (1) the abbreviation is expanded with the most probable expansion if the ratio is above a first threshold value; (2) the most probable expansion is highlighted (or suggested) for the user 112 to select if the ratio is below the first threshold but above a second, lower threshold value; and (3) the abbreviation is not expanded if the ratio is below the second threshold value. The first and second threshold values may differ or change over time or across different types of abbreviations. If a user does select the highlighted expansion in the second strategy, then the query is rewritten with that expansion and submitted to the search engine 104, which regenerates search results based on the rewritten query.

Abbreviation Disambiguation

This section expands on the functioning of the language modeler 144 and the methods used to analyze search query terms in arriving at a determination whether or not to expand an abbreviation. To expand abbreviations, it is desired to model the probability of an expansion given the abbreviation and the context of abbreviation, P(E|AC), where E is an expansion, A is the abbreviation and C is the context, e.g., other terms than A in the query.

$$P(E|AC)=P(C|AE)P(E|A)P(C|A) \propto P(E|A)P(C|AE) \quad (1)$$

where P(E|A) is the prior probability of meaning E when seeing (or being located adjacent to) A, P(C|AE) is the conditional probability of C occurring in the context of being located adjacent both A and E. To compute P(C|AE), one may apply n-gram language models, but in this application, the words $c_i$ in C are assumed to be independent when A, E are given, for simplicity. Thus $$P(E/AC) \propto P(E/A) \prod_i P(c_i/AC), \quad (2)$$

where P(E|A) and P($c_i$|AE) can be computed from the three different resources: anchor text, query logs, and click logs.

A first case, which is strategy number (3) above, is one in which E=$E_A$. A special expansion of E=$E_A$ in Equation 2 is to represent the situation in which not to expand, e.g., $E_A$ itself represents A. In this case, $$P(E_A/AC) \propto P(E_A/A) \prod_i P(c_i/AE_A), \quad (3)$$

where P($E_A$|A) is estimated from some other text resources, the details of which will not be discussed herein. It is expensive, however, to estimate P($c_i$|AE$_A$) because enough examples of query term with labels will be needed to show whether a term is a to-be-expand abbreviation or not. For simplicity, the distribution of term $c_i$ in a 3-month query log may be used as an approximation.

A second case, which addresses strategy number (1) above, is where the expansion of an abbreviation is not the abbreviation itself, e.g., E≠$E_A$. In other words, E is a true expansion.

For the three web resources of anchor text, click log, and query log, defined are three types of estimation as following:

Anchor Text

Determining the probability of an expansion given the abbreviation (right side of Equation 2) may be expressed as:

$$P(E/A) = \frac{\sum_{e \in colinked(A)} Weight(e)}{\sum_{G} \sum_{g \in colinked(A)} Weight(g)} (1 - P(E_A/A)), \quad (4)$$

where colinked(A) is a set of all anchor texts that have co-linked pages with A when A is anchor text, Weight(e) is a link-weight of anchor text e, e is an anchor text of E, and g is an anchor text of G where G can be any text.

Determining a probability that a context will co-occur given the expansion of the abbreviation may be expressed as:

$$P(c_i/AE) = \frac{\sum_{ac_i \in colinked(E)} Weight(c_i) * freq(c_i/ae)}{\sum_{wa \in colinked(E)} \sum_{w} Weight(w) * freq(w/ae)} \quad (5)$$

where colinked(E) is a set of all anchor texts that have co-linked pages with E when E is anchor text, freq($c_i$|ae) is a frequency of $c_i$, a query word in the anchor text given that e is the expansion of abbreviation a, Weight($c_i$) is a link-weight of anchor text $c_i$, w can be any word, and Weight(w) is a link-weight of anchor text w. The weight referred to in Equations 4 and 5 may be related to the frequency of links from one page to another page, e.g., the frequency of the relevant anchor text linking to another page.

The effects of including context that encompasses query logs and/or click logs may be linearly combined and smoothed to include additional probability context, and therefore, additional accuracy in determining probabilities of co-occurrence.

Query Logs

Equation 6 is an additional expression for the probability that takes into consideration query logs, expressed as:

$$P(c_i/AE) = \frac{freq(c_i/ae)}{\sum_{w} freq(w/ae)} \quad (6)$$

where freq($c_i$|ae) is the frequency of $c_i$, a query word in an aggregate of query logs, given that e is the expansion of abbreviation a. Accordingly, the frequency of the contextual term in relation to co-occurrence with the expansion of the abbreviation allows consideration of additional contextual information during the probability analysis.

Click Logs

A query similarity matrix may be derived from the click logs. For each query there is a vector of clicked URLs; if a URL is clicked, then the corresponding value is set to be one (1), and the query similarity score of two queries is computed between the two click-log vectors based on the assumption that two similar queries usually result in similar clicked URLs. To compute context information from query similarity scores:

$$P(c_i/AE) = \frac{Sim(c_i/ae) * freq(c_i/ae)}{\sum_{w} Sim(c_i/ae) * freq(w/ae)} \quad (7)$$

where Sim($c_i$|ae) is the similarity score between a query containing $c_i$, a query word in an aggregate of click logs with the expansion e.

Combining Contextual Information

One may define the final probability of P($c_i$|AE) in Equation 2 to be a mixture of Equations 5, 6, and 7. The mixture weight will be determined by experience due to the lack of test examples caused by the small percentage of queries containing abbreviations, which will be discussed below. The mixture probability of P($c_i$|AE) will then be smoothed on the background of a 3-month query log with linear smoothing. The applicants tested with both of linear smoothing and Dirichlet smoothing and found that linear smoothing achieves better results.

Experiments

To show the effectiveness of the above-described model, it was run on 1359 multi-word queries (queries that contain more than one word for disambiguation), which are random samples from query logs and have been manually labeled with corresponding expansions. In these experiments, an abbreviation term is a term that should be expanded through the abbreviation dictionary 160. There are 56 abbreviation terms in the 1359 queries; a non-abbreviation term is defined as a term that should not be expanded; and there are 4370 non-abbreviation terms in total. The precision and recall of the abbreviation terms and non-abbreviation terms from the model are presented in Table 1. Note that only when an abbreviation term is associated with the correct expansion will it be counted as a positive example.

TABLE 1

Results of the abbreviation disambiguation experiments

| Parameters | Abbreviation Terms | | Non-abbreviation Terms | |
|---|---|---|---|---|
| | Precision | Recall | Precision | Recall |
| First Setting | 100% | 30.4% | 99.1% | 100% |
| Second Setting | 77.8% | 50% | 99.2% | 99.8% |

Abbreviation disambiguation is overall a difficult problem. From experimental comparisons, the model is at least as effective as the abbreviation disambiguation in current major search engines. As discussed above, precision is an important factor to query expansion and thus high precision is preferred over recall in parameter settings. This may be accomplished by reducing the number of expansions, especially where faced with a questionable probability of improving the search results of a query. The results may be further improved by applying an n-gram language model in Equation 1.

Figure 3:
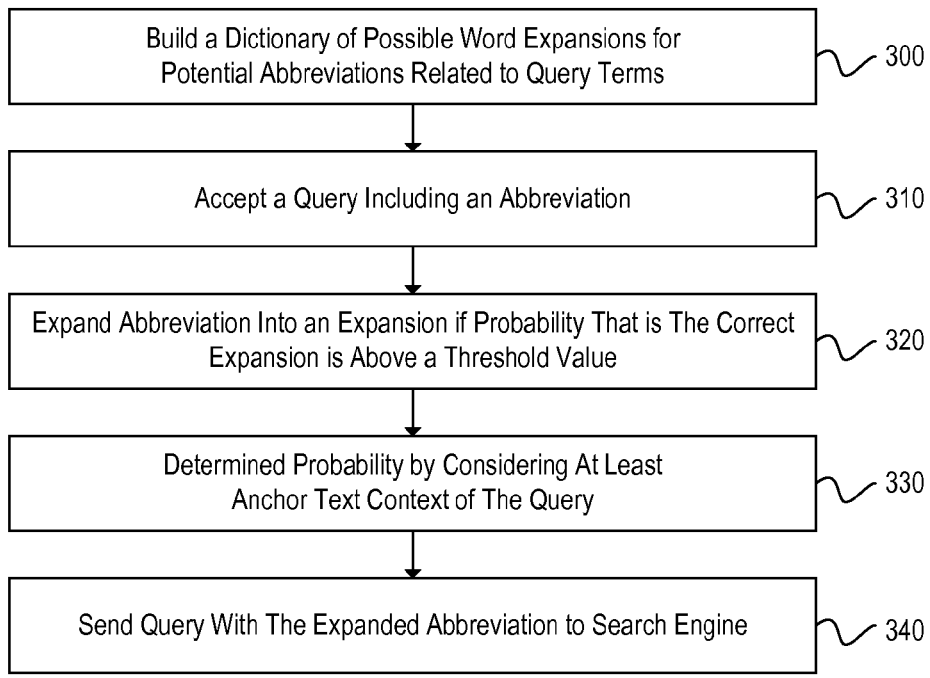
FIG. 3 is a flow chart of an exemplary method for handling abbreviations detected in search queries.

FIG. 3 is a flow chart of an exemplary method for handling abbreviations detected in search queries. The method, at block 300, builds an abbreviation dictionary 160 of a plurality of possible word expansions for a plurality of potential abbreviations related to query terms received or anticipated to be received by a search engine 104. At block 310, it accepts a query including an abbreviation. At block 320, it expands the abbreviation into one of the plurality of word expansions if a probability that the expansion is correct is above a threshold value. At block 320, the probability is determined by taking into consideration a context of the abbreviation within the query, where the context includes at least anchor text. At block 340, its sends the query with the expanded abbreviation to the search engine 104 to generate a search results page related to the query.

Figure 4:
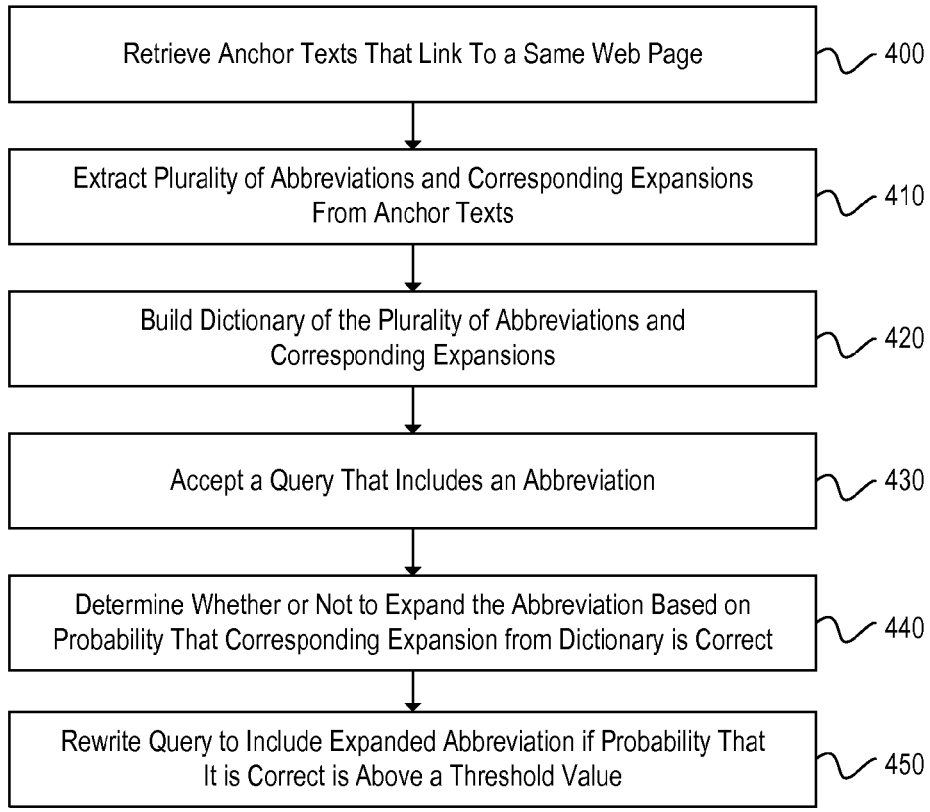
FIG. 4 is a flow chart of another embodiment of a method for handling abbreviations detected in search queries.

FIG. 4 is a flow chart of another embodiment of a method for handling abbreviations detected in search queries. The method, at block 400, retrieves anchor texts that link to a same web page. At block 410, it extracts a plurality of abbreviations and corresponding expansions from the anchor text. At block 420, it builds an abbreviation dictionary of the plurality of the abbreviations and corresponding expansions in a database 160. At block 430, it accepts a query including an abbreviation. At block 440, it determines whether or not to expand the abbreviation in the query based on a probability that a corresponding expansion from the dictionary 160 is correct is above a threshold value. The probability is determined by taking into account a context that includes one or more of anchor text, query logs, and click logs. At block 450, it rewrites the query to include an expanded abbreviation if the probability that the expansion is correct is above the threshold value, where the results produced by a search engine 104 in response to search queries are improved.

In the foregoing description, numerous specific details of programming, software modules, user selections, network transactions, database queries, database structures, etc., are provided for a thorough understanding of various embodiments of the systems and methods disclosed herein. However, the disclosed system and methods can be practiced with other methods, components, materials, etc., or can be practiced without one or more of the specific details. In some cases, well-known structures, materials, or operations are not shown or described in detail. Furthermore, the described features, structures, or characteristics may be combined in any suitable manner in one or more embodiments. The components of the embodiments as generally described and illustrated in the Figures herein could be arranged and designed in a wide variety of different configurations.

The order of the steps or actions of the methods described in connection with the disclosed embodiments may be changed as would be apparent to those skilled in the art. Thus, any order appearing in the Figures, such as in flow charts, or in the Detailed Description is for illustrative purposes only and is not meant to imply a required order.

Several aspects of the embodiments described are illustrated as software modules or components. As used herein, a software module or component may include any type of computer instruction or computer executable code located within a memory device and/or transmitted as electronic signals over a system bus or wired or wireless network. A software module may, for instance, include one or more physical or logical blocks of computer instructions, which may be organized as a routine, program, object, component, data structure, etc. that performs one or more tasks or implements particular abstract data types.

In certain embodiments, a particular software module may include disparate instructions stored in different locations of a memory device, which together implement the described functionality of the module. Indeed, a module may include a single instruction or many instructions, and it may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Various modifications, changes, and variations apparent to those of skill in the art may be made in the arrangement, operation, and details of the methods and systems disclosed. The embodiments may include various steps, which may be embodied in machine-executable instructions to be executed by a general-purpose or special-purpose computer (or other electronic device). Alternatively, the steps may be performed by hardware components that contain specific logic for performing the steps, or by any combination of hardware, software, and/or firmware. Embodiments may also be provided as a computer program product including a machine-readable medium having stored thereon instructions that may be used to program a computer (or other electronic device) to perform processes described herein. The machine-readable medium may include, but is not limited to, floppy diskettes, optical disks, CD-ROMs, DVD-ROMs, ROMs, RAMs, EPROMs, EEPROMs, magnetic or optical cards, propagation media or other type of media/machine-readable medium suitable for storing electronic instructions. For example, instructions for performing described processes may be transferred from a remote computer (e.g., a server) to a requesting computer (e.g., a client) by way of data signals embodied in a carrier wave or other propagation medium via a communication link (e.g., network connection).

The invention claimed is:

1. A method for handling abbreviations in web queries, the method comprising:
    building a dictionary of a plurality of possible word expansions for a plurality of potential abbreviations related to query terms received and anticipated to be received by a search engine, the search engine coupled with a processor;
    accepting, by the search engine, a query including an abbreviation from a searching user, where a probability of finding a most probably-correct expansion in the dictionary comprises a first probability, and a probability that the expansion is the abbreviation itself comprises a second probability;
    determining, by the processor, a ratio between the first and second probabilities;
    expanding, by the processor, the abbreviation in accordance with the most probably-correct expansion when the ratio is above a first threshold value; and
    highlighting, by the processor, the abbreviation with a suggested expansion of the most probably-correct expansion to enable the user to accept the suggested expansion by selection thereof when the ratio is between a second, lower threshold value and the first threshold value.

2. The method of claim 1, further comprising:
    sending the query with the expanded abbreviation to the search engine to generate a search results page related to the expanded query in response to a user selection of the highlighted abbreviation.

3. The method of claim 1, further comprising:
    not highlighting the abbreviation to suggest an expansion when the ratio is below the second threshold value; and
    sending the query with the unexpanded abbreviation to the search engine to generate a search results page related thereto.

4. The method of claim 1, where the first and second probabilities are determined by taking into consideration a context of the abbreviation within the query, where the context is taken from one or more selected from the group consisting of anchor text, query logs, and click logs.

5. The method of claim 4, where the probability of the expansion being correct given the abbreviation and the context, P(E|AC), is proportional to $$P(E/A) \prod_i P(c_i/AC),$$

where E is the expansion, A is the abbreviation, C is the context, and $c_i$ is a context word.

6. The method of claim 5, where P(E|A) is given by:

$$P(E/A) = \frac{\sum_{e \in colinked(A)} \text{Weight}(e)}{\sum_G \sum_{g \in colinked(A)} \text{Weight}(g)} (1 - P(E_A/A)),$$

where colinked(A) is a set of all anchor texts that have co-linked pages with A when A is anchor text, Weight(e) is a link-weight of anchor text e, e is an anchor text of E, and g is an anchor text of G where G can be any text.

7. The method of claim 6, where when the context includes the anchor text, the method further comprising:
determining a probability that the context will co-occur given the expansion of the abbreviation as $$P(c_i/AE) = \frac{\sum_{ac_i \in colinked(E)} \text{Weight}(c_i) * freq(c_i/ae)}{\sum_{wa \in colinked(E)} \sum_w \text{Weight}(w) * freq(w/ae)},$$

where colinked(E) is a set of all anchor texts that have co-linked pages with E when E is anchor text, freq($c_i$|ae) is a frequency of $c_i$, a query word in the anchor text given that e is the expansion of abbreviation a, Weight($c_i$) is a link-weight of anchor text $c_i$, w can be any word, and Weight(w) is a link-weight of anchor text w.

8. The method of claim 7, where when the context includes query logs, the method further comprising:
linearly combining and smoothing the probability P($c_i$|AE) with $$\frac{freq(c_i/ae)}{\sum_w freq(w/ae)},$$

where freq($c_i$|ae) is a frequency of $c_i$, a query word in an aggregate of query logs, given that e is the expansion of abbreviation a.

9. The method of claim 8, where when the context includes click logs, the method further comprising:
linearly combining and smoothing the probability P($c_i$|AE) with $$\frac{Sim(c_i/ae) * freq(c_i/ae)}{\sum_w Sim(c_i/ae) * freq(w/ae)},$$

where Sim($c_i$|ae) is a similarity score between a query containing $c_i$, a query word in an aggregate of click logs with the expansion e.

10. The method of claim 1, where the dictionary is built offline, the method further comprising:
retrieving anchor texts that point to a same web page; and
extracting abbreviations and corresponding expansions within the anchor text that are formed as initialisms.

11. The method of claim 1, further comprising:
rewriting the query to include the expansion of the abbreviation in response to user selection of the suggested expansion; and
regenerating a set of search results for the user based on the rewritten query.

12. A system for handling abbreviations in we queries, the system comprising:
a memory containing instructions for execution by a processor;
an abbreviation expansion database containing a dictionary of a plurality of possible word expansions for a plurality of potential abbreviations related to query search terms;
a communicator operable to accept a query from a searching user that includes an abbreviation and programmed to send search queries to a search engine;
a language modeler coupled with the memory, the processor, and the communicator, the language modeler programmed to:
determine as a first probability a probability of finding a most probably-correct expansion in the dictionary, and as a second probability, a probability that the expansion is the abbreviation itself;
determine a ratio between the first and second probabilities;
expand the abbreviation in accordance with the most probably-correct expansion when the ratio is above a first threshold value; and
highlight, through the communicator in a search results page of the user, the abbreviation with a suggested expansion of the most probably-correct expansion, to enable the user to accept the suggested expansion by selection thereof when the ratio is between a second, lower threshold value and the first threshold value.

13. The system of claim 12, further comprising:
an expander coupled with the language modeler and programmed to rewrite the query to include an expanded abbreviation in response to user selection of the suggested expansion, where the communicator is programmed to send the query with the expanded abbreviation to the search engine, which thereby sends improved search results to the search results page of the user.

14. The system of claim 12, where when the ratio is below the second threshold value, the language modeler further programmed to not highlight the abbreviation to thus not suggest an expansion; and the communicator is further programmed to send the query with the unexpanded abbreviation to the search engine to generate a search results page for the user.

15. The system of claim 12, where the language modeler is programmed to determine the first and second probabilities by taking into consideration a context of the abbreviation within the query, where the context is taken from one or more selected from the group consisting of anchor text, query logs, and click logs.

16. The system of claim 12, where to build the abbreviation expansion database, the processor is programmed to:
retrieve anchor texts that point to a same web page; and
extract abbreviations and corresponding expansions within the anchor text that are formed as initialisms.

17. A non-transitory, machine-readable storage medium comprising a set of instructions for handling abbreviations in web queries, the set of instructions executable by a computer having a processor and memory, the machine-readable medium comprising:
- instructions to direct the processor to build a dictionary of a plurality of possible word expansions for a plurality of potential abbreviations related to query terms received and anticipated to be received by a search engine coupled with the processor;
- instructions to accept a query including an abbreviation in response to signals representative of a submission of the query by a searching user to the search engine, where a probability of finding a most probably-correct expansion in the dictionary comprises a first probability, and a probability that the expansion is the abbreviation itself comprises a second probability;
- instructions to direct the processor to determine a ratio between the first and second probabilities;
- instructions to direct the processor to expand the abbreviation in accordance with the most probably-correct expansion when the ratio is above a first threshold value; and
- instructions to direct the processor to highlight, in a search results page of the user, the abbreviation with a suggested expansion of the most probably-correct expansion, to enable the user to accept the suggested expansion by selection thereof when the ratio is between a second, lower threshold value and the first threshold value.

18. The machine-readable storage medium of claim 17, further comprising:
- instructions to direct the processor to send the query with the expanded abbreviation to the search engine to generate a search results page related to the expanded query in response to user inputs representative of a user selection of the highlighted abbreviation.

19. The machine-readable storage medium of claim 17, further comprising:
- instructions to direct the processor to not highlight the abbreviation to suggest an expansion when the ratio is below the second threshold value; and
- instructions to direct the processor to send the query with the unexpanded abbreviation to the search engine to generate a search results page related thereto.

20. The machine-readable storage medium of claim 17, further comprising:
- instructions to direct the processor to determine the first and second probabilities by taking into consideration a context of the abbreviation within the query, where the context is taken from one or more selected from the group consisting of anchor text, query log, and click logs.

21. The machine-readable storage medium of claim 17, further comprising:
- instructions to direct the processor to retrieve anchor texts that point to a same web page; and
- instructions to direct the processor to extract abbreviations and corresponding expansion within the anchor text that are formed as initialisms.

22. The machine-readable storage medium of claim 17, further comprising:
- instructions to rewrite the query to include the expansion of the abbreviation in response to user inputs representative of a user selection of the suggested abbreviation; and
- instructions to regenerate a set of search results for the user based on the rewritten query.

* * * * *